March 5, 1963 — H. G. SHIVELY — 3,079,826
TREAD PERFORATING APPARATUS
Filed Aug. 23, 1960 — 2 Sheets-Sheet 2

INVENTOR.
HARMON G. SHIVELY
BY
ATTY.

United States Patent Office 3,079,826
Patented Mar. 5, 1963

3,079,826
TREAD PERFORATING APPARATUS
Harmon G. Shively, Akron, Ohio, assignor to The B. F. Goodrich Company, New York, N.Y., a corporation of New York
Filed Aug. 23, 1960, Ser. No. 51,311
5 Claims. (Cl. 83—314)

This invention relates to equipment for the perforation of elastomeric materials, and, more particularly, to apparatus for the perforation of automative tire tread stock.

In the production of tires in which a strip of unvulcanized tread stock is cemented onto a carcass of elastomeric cord fabric previously fabricated on a collapsible and rotatable tire building drum, it is necessary that the operator roll and stitch the tread stock, to "milk out" from under the stock any air trapped thereunder. This is a particularly arduous task when the tread and sidewalls are made as a single component. The extreme width of such a component makes it difficult for the operator to "milk" air from under the center portion of the tread section to the edges of the sidewall portions. In the event that even a small amount of air is allowed to remain between the carcass and tread stock, during vulcanization this small volume of air will expand causing the tread to separate from the carcass and resulting in a defective product.

In the past, in order to provide escape routes for the trapped air, before stitching the tread down the operator would perforate the tread stock as the tire band rotated on its building form with a hand awl. This method was wholly inadequate because of the likelihood of the awl not passing completely through the tread stock or, on the other hand, passing completely through the entire carcass in such a way that the hole made thereby did not close again during subsequent operations, with resultant loss of air retaining properties, particularly in the case of tubeless tires. In addition, before applying the tread stock to the carcass, attempts were made to pass the tread stock beneath a pricking roll having radially projecting, tapered prick pins rigidly mounted on its outer surface. Here again, the solution was imperfect. The pins entered the tread stock at an angle, moved through the perpendicular as the tread stock advanced and left the stock at an angle, leaving an elongated triangular hole in the stock which quite often failed to close during subsequent vulcanization.

It is a principal object of this invention, therefore, to provide an apparatus for pricking tread stock wherein the aforementioned difficulties are eliminated or alleviated.

It is another object of this invention to provide an apparatus for forming small, air bleeding passages in tire tread stock, wherein the apparatus is provided with a plurality of pins so mounted thereon that in penetrating the said tread stock they remain perpendicular thereto during movement of said tread stock through the apparatus.

It is a further object of this invention to provide an apparatus as described in the preceding paragraph, wherein the apparatus is provided with a series of jointly rotatable discs each having a plurality of the said pricking pins rockably mounted thereon.

It is a still further object of this invention to provide an apparatus as described in the preceding paragraph wherein said pins are mounted in such a manner that they enter the tread stock perpendicularly thereto and remain perpendicularly thereto until removed from said tread stock.

Further objects and advantages of the invention will be apparent from the description and claims which follow, and the drawings which are attached hereto and made part hereof and in which:

Figure 1:
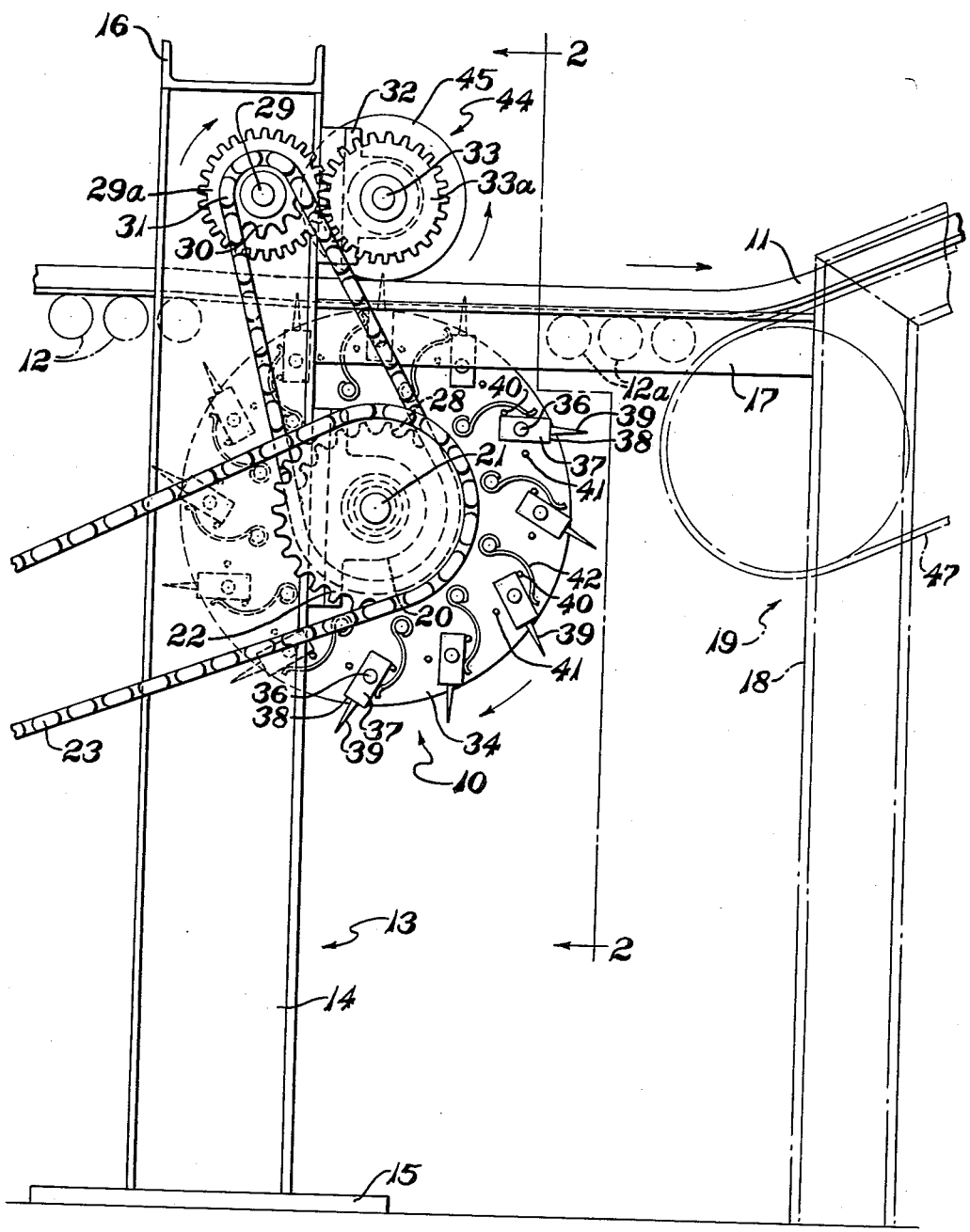
FIG. 1 is a front elevational view of the apparatus.

The apparatus 10 for perforating the elastomeric material used in treads of vehicle tires, which material is known as tread stock, is preferably situated in a tire tread stock production line at some point between the stock cooling operation and the length trimming operation, neither of which are shown. The tread stock strip 11 is horizontally conveyed from station to station by means of a suitable conveyor system, shown only schematically in FIG. 1 by means of rotatable rollers 12 and 12a, and the take-away conveyor 19 shown only in phantom.

One form of the apparatus 10 for effecting the desired perforations of tire tread stock is illustrated in the drawings as including a suitable frame 13, comprising a pair of spaced vertical stanchions 14 mounted on a suitable base plate 15. Mounted on the upper ends of stanchions 14 is a horizontal channel beam 16. At a distance from the upper end of each stanchion 14 is mounted, by its one end, a horizontal angle beam 17, the other end of each beam 17 being mounted to the vertical frame member 18 of the stock take-away conveyor 19.

Mounted at one side of each of the vertical stanchions 14 are pillow blocks 20 in which is journalled a horizontal, rotatable shaft 21. Mounted on one end of the shaft 21 is a drive sprocket 22. Shaft 21 is rotated by means of a drive chain 23 passing about drive sprocket 22 and a second drive sprocket 24 mounted on the output shafts 25 of a speed reducer 26, shown only in FIG. 2, which is mounted on a suitable support frame 27. The reducer 26 is, turn, connected to a drive motor, not shown. Also mounted on shaft 21 adjacent drive sprocket 22 is a small transmission sprocket 28. Above sprocket 28 a shaft 29 is rotatably journalled by one end in one of the stanchions 14. Mounted on the outer end of shaft 29 is a second transmission sprocket 30 which is held in driving engagement with sprocket 28 by means of a transmission chain 31. Rotatably mounted in a second pair of pillow blocks 32, which are each mounted near the upper end of one of the stanchions 14, respectively, is a shaft 33 held in direct driving engagement with shaft 29 by means of a pair of meshed spur gears 29a and 33a, mounted on the end of shaft 33 and on shaft 29 adjacent sprocket 30, respectively. Thus, as shaft 21 is rotated clockwise, as viewed in FIG. 1, shaft 33 is rotated in the opposite direction.

Mounted on an enlarged portion 21a of shaft 21 are a plurality of discs 34 each having a mounting boss portion 35. On pins 36, mounted perpendicularly to the plane of said discs 34 near the periphery of each of said discs, are pivotally mounted a plurality of small, perforating pin mounting blocks 37 in equally circumferentially spaced relationship to one another. The blocks 37 are so mounted that their outer end faces 38 may coincide with a plane tangent to the discs 34. Press fitted perpendicularly into the outer face 38 of each block 37 is a tapered stock perforating pin 39. As viewed in FIG. 3, clockwise pivotal movement of each of the blocks 37 is limited by its respective limit pin 40 and its counterclockwise movement is limited by its respective limit pin 41. Each block 37 is normally held against its limit pin 40 by means of a curved, single leaf spring 42, one end of which is mounted on disc 34 by means of a split pin 43 press fitted into the face of disc 34, the other end of which spring is biased against block 37. The spring tension is such that it just overbalances the tendency of the block 37 to pivot counterclockwise when on the left side of a vertical line passing through the center of the disc 34, as viewed in FIG. 1. Thus, when the perforating pins 39 engage the tread stock strip 11 they remain perpendicular to the stock upon entry, while being forced through the stock and upon retraction from the stock, to leave a clean, unlacerated perforation in the stock 11 which, upon the heat and pressure of subsequent vulcanization, will readily close.

Coaxially mounted on an enlarged portion 33b of shaft 33 above discs 34 are a plurality of double disced members 44, equal in number to the number of the discs 34, each having a pair of parallel disc-shaped portions 45 which are separated by a boss 46. The members 44 are spaced upon the enlarged portion 33b of shaft 33 in such a manner that the perforating pins 39 pass between the pair of disc portions 45 of each member 44. These members serve as a back-up for the tread strip 11 preventing the strip 11 from merely riding on the points of the pins 39 without being perforated thereby. The members 45 and 46 may be replaced by a cylindrical roll of high abrasion resistant elastomeric material such as a polyurethane. The ratios of sprockets 22, 28, and 30, and gears 29a and 33a are so selected that the surface speeds of the discs 34 and the disc portions 45 of members 44 are equal.

Figure 3:
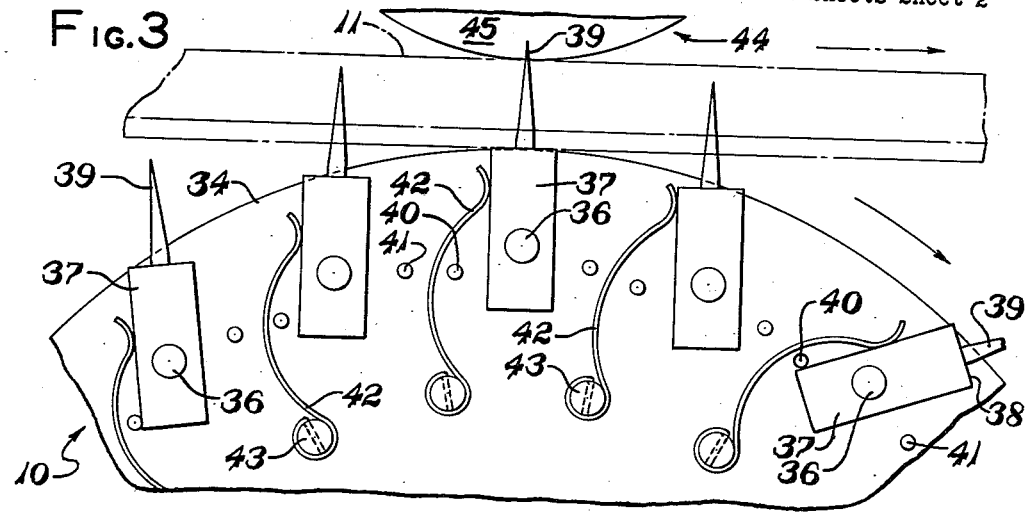
FIG. 3 is an enlarged fragmentary view of a portion of FIG. 1, more clearly showing the angular displacement of the pricking pins relative to the plane of the tread stock.
Figure 2:
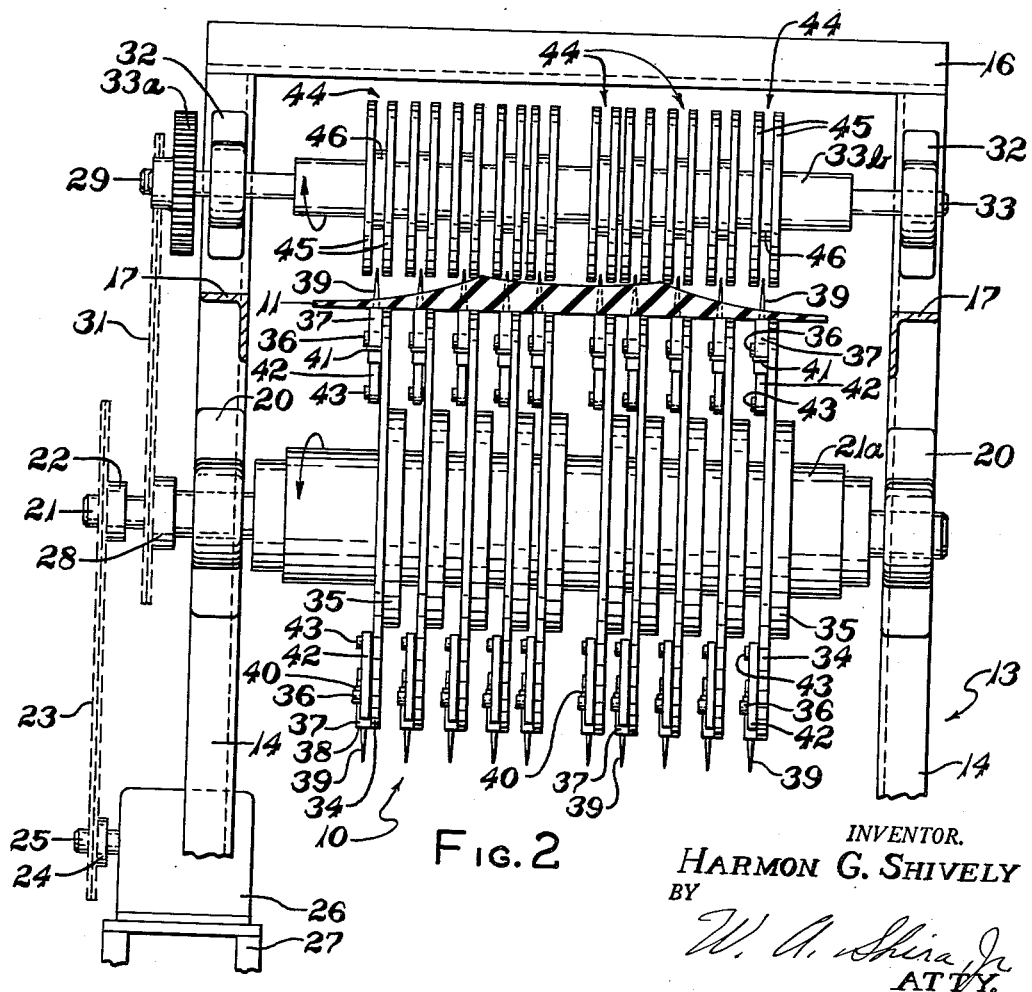
FIG. 2 is a transverse sectional view of the apparatus taken along line 2—2 of FIG. 1.

In operation of the apparatus 10, a continuous strip of freshly extruded and cooled tread stock 11 is conveyed by means of the conveyor rolls 12 to the apparatus 10. The strip 11 is fed between the rotating discs 34 and members 44, over and upon the take-off conveyor rolls 12a rotatably mounted between the horizontal angle beams 17, and thence to the conveyor belt 47 of the takeaway conveyor 19. As discs 34 engage the underside of the strip 11, each perforating pin 39 sequentially engages the stock to a point at the left of the point of tangential contact of the strip 11 and discs 34, as seen in FIGS. 1 and 3; and, as the strip 11 proceeds through bight of the discs 34 and members 44, the pins remain perpendicular to the strip 11. This causes blocks 37 to rotate counterclockwise relative to their mounting pins 36, away from limit pins 40 and acting against leaf springs 42. As the perforating pins 39 disengage the strip 11 the springs 42 force the blocks 37 back to their normal position abutting limit pins 40. Since the perforating pins 39 are at all times perpendicular to the stock while engaged therewith, the strip 11 does not tend to follow the pins 39 subsequent to their disengagement with the strip.

Although this invention has been described with respect to a specific embodiment, it will be readily apparent to those skilled in the art to which it pertains that will have application to materials other than tire tread stock and that changes and modifications may be made in the apparatus without departing from the spirit and scope of the invention as defined in the appended claims.

Having thus described the invention, I claim:

1. An apparatus for perforating unvulcanized elastomeric sheet material; comprising a frame; a plurality of axially parallel and horizontally spaced material supporting rolls rotatably mounted on said frame; means to move sheet material in the direction of its length over and upon said rolls; a plurality of rotatable, horizontally coaxial members mounted on said frame adjacent the path of travel of said sheet material; a pluarlity of material perforating pins; means pivotally mounting said pins on said coaxial members for pivotal movement in either direction as said coaxial members are rotated in only one direction and for sequential perpendicular penetrating engagement with said material as said material is moved in the direction of its length; means limiting the pivotal movement of said pins on said coaxial members in one direction; urging means normally urging each of said pins to the limit of its movement in said one direction, said limiting means being so disposed that each sad pin will be disposed perpendicular to the plane of sheet material as it is carried into sequential penetration therewith, said urging means generating a force insufficient to limit pivotal movement of the pins during said penetrating engagement, whereby said pins are maintained in perpendicular relationship with said sheet material during penetrating engagement therewith.

2. An apparatus for perforating unvulcanized elastomeric strip material; comprising a frame; a plurality of axially parallel and horizontally laterally spaced strip material supporting rolls rotatably mounted on said frame; means to move strip material in the direction of its length over and upon said rolls; a plurality of horizontally coaxial disc-shaped members rotatably mounted on said frame in selected spaced relationship; a plurality of strip material perforating pins pivotally mounted for pivotal movement in opposite directions on each of said disc-shaped members in equal, circumferentially spaced relationship for sequential penetration of said material being moved in the direction of its length; means limiting the pivotal movement of each of said pins on said disc-shaped members in one direction; urging means normally urging each of said pins to the limit of its pivotal movement in one direction, said limiting means being so disposed that each said pin will be disposed axially perpendicular to the plane of said sheet material being moved in the direction of its length as said pin is carried into sequential penetration therewith, said urging means generating a force insufficient to limit pivotal movement of said pins during said penetrating engagement, whereby said pins are maintained in perpendicular relationship with said sheet material during penetrating engagement therewith; and means to jointly rotate said disc-shaped members.

3. An apparatus for perforating unvulcanized elastomeric strip material; comprising a frame; a plurality of axially parallel and horizontally laterally spaced strip material supporting rolls rotatably mounted on said frame; a plurality of horizontally coaxial disc-shaped members rotatably mounted on said frame in selected, spaced relationship; a plurality of material perforating pins movably mounted on each of said disc-shaped members in equal, circumferentially spaced relationship for sequential penetration of material supported by said rolls as said disc-shaped members are rotated; means limiting the movement of said pins in one direction relative to said disc-shaped members; urging means normally urging each of said pins to the limit of its movement in said one direction, said limiting means being so disposed that each said pin may be oriented in a position such that it is axially perpendicular to the plane of strip material supported by said rolls as said pin is sequentially moved to said penetration, said urging means generating a force insufficient to limit pivotal movement of the pins during said penetrating engagement whereby each said pin is free to move in either direction relative to its respective disc-shaped member while engaged in said penetration to maintain said position with respect to said material; a roll member rotatably mounted on said frame axially parallel to and vertically spaced from said disc-shaped members, and adapted to contact said material on the side thereof opposite said pins; and means to rotate said roll member and said disc-shaped members jointly in opposite directions.

4. An apparatus for perforating unvulcanized elastomeric strip material; comprising a frame; a plurality of coaxial, disc-shaped members rotatably mounted on said frame in axially spaced relationship; at least one material perforating pin mounted on each of said members for pivotal movement in either direction about an axis parallel to the axis of rotation of said members and perpendicular to the axis of said pin as said disc-shaped members are rotated in one direction, means limiting the extent of said pivotal movement in each direction, within the limits of which movement said axis is free to be pivoted for continued perpendicular orientation with respect to said material during engagement with said material as said members are rotated; resilient means associated with each of said pins normally resiliently retaining the latter at the limit of its pivotal movement in one direction, to thereby initially orient said pin in position for initial perpendicular orientation with respect to said material; said resilient means generating a force insufficient to retain said pins at the said limit of its pivotal movement in one direction during said engagement, whereby said pins are maintained in perpendicular relationship with said sheet material during penetrating engagement with said strip material; means to jointly rotate said disc-shaped members; and means to move each increment of said material in the direction of its length to and from a position for contact with said pins.

5. An apparatus as defined in claim 3, wherein said roll member comprises a shaft, and a plurality of double disc-shaped members mounted on said shaft in selected spaced relationship.

References Cited in the file of this patent
UNITED STATES PATENTS

| | | |
|---|---|---|
| 345,695 | Heebner | July 20, 1886 |
| 1,581,236 | Speer | Apr. 20, 1926 |
| 2,748,863 | Benton | June 5, 1956 |
| 2,781,095 | Spinner | Feb. 12, 1957 |

UNITED STATES PATENT OFFICE
CERTIFICATE OF CORRECTION

Patent No. 3,079,826                      March 5, 1963

Harmon G. Shively

It is hereby certified that error appears in the above numbered patent requiring correction and that the said Letters Patent should read as corrected below.

Column 2, line 34, before "turn" insert -- in --; column 3, line 34, before "bight" insert -- the --; line 47, before "will" insert -- it --; line 71, for "sad" read -- said --; column 4, line 2, for "egnagement" read -- engagement --.

Signed and sealed this 29th day of October 1963.

(SEAL)
Attest:

ERNEST W. SWIDER
Attesting Officer

EDWIN L. REYNOLDS
Acting Commissioner of Patents